United States Patent [19]

Horii

[11] Patent Number: 4,928,908

[45] Date of Patent: May 29, 1990

[54] BALLOON MADE OF METAL VAPOR DEPOSITED FILM

[75] Inventor: Shigeo Horii, Kyoto, Japan

[73] Assignee: Reiko Co., Ltd., Kyoto, Japan

[21] Appl. No.: 437,767

[22] Filed: Nov. 16, 1989

Related U.S. Application Data

[63] Continuation of Ser. No. 127,643, Dec. 2, 1987, abandoned.

[30] Foreign Application Priority Data

Jun. 12, 1987 [JP]  Japan .................................. 62-147635
Jul. 29, 1987 [JP]  Japan .................................. 62-189806

[51] Int. Cl.$^5$ ........................... B64B 1/58; B64B 1/40
[52] U.S. Cl. ..................................................... 244/31
[58] Field of Search ................... 244/126, 31; 428/208

[56] References Cited

U.S. PATENT DOCUMENTS

| | | | |
|---|---|---|---|
| 4,077,588 | 3/1978 | Hurst | 244/126 |
| 4,340,276 | 7/1982 | Moffitt et al. | 428/148 |
| 4,407,871 | 10/1983 | Eisfeller | 428/208 |

Primary Examiner—Joseph F. Peters, Jr.
Assistant Examiner—Anne Sartelle
Attorney, Agent, or Firm—Morgan & Finnegan

[57] ABSTRACT

The balloon according to the invention is formed by heat-sealing at least one heat-sealable sheet which comprises a plastic film and a metal vapor deposition layer formed on one side of the plastic film. The metal vapor deposition layer is discontinuously formed so that the sheet has a metallic but insulating surface. Resultantly, the balloon having a dielectric breakdown voltage of not less than 1000 V can be easily obtained. Preferably, the metal vapor deposition layer is formed in a state of islands in the sea, the size of the island being 200 Å to 1 $\mu$m and the interval between the islands being 100 Å to 5000 Å.

8 Claims, No Drawings

BALLOON MADE OF METAL VAPOR DEPOSITED FILM

This is a continuation of co-pending application Ser. No. 07/127,643, filed on Dec. 2, 1987 abandoned.

FIELD OF THE INVENTION

The invention relates to a balloon made of a metal vapor deposition film, and particularly to a metallic balloon useful as a toy, a decoration in show windows, an advertising material and the like.

BACKGROUND OF THE INVENTION

Generally, metallic balloons are made of a metal vapor deposition film such as Al vapour deposition films. Although the metallic balloons have a beautiful metallic gloss, there exist possibilities to cause various troubles such as causing a fire, damaging a person, causing an error operation of computers and the like by contacting the balloon with an electric wire, because of the electroconductive property of the metal vapour deposition layer.

Accordingly, a main object of the invention is to provide a metallic balloon having a beautiful metallic gloss but does not have an electroconductive property so that the balloon does not cause troubles by contacting it with electric wires.

SUMMARY OF THE INVENTION

A balloon according to the invention is formed by heat-sealing at least one heat-sealable sheet which comprises a plastic film and a metal vapor deposition layer formed on one side of the plastic film. The metal vapor deposition layer is discontinuously formed so that the sheet has a metallic appearance but has an insulating property.

The heat-sealable sheet may comprise a plastic film, a metal vapor deposition layer formed on one side of the plastic film and a heat-sealable layer formed on the outer surface of either the plastic film or the metal vapor deposition layer, but, when the plastic film itself is heat-sealable, the sheet may comprise only a plastic film and a metal vapor deposition layer formed on one side of the plastic film.

DETAILED DESCRIPTION OF THE INVENTION

According to the invention, the metal vapor deposition layer is discontinuously formed on a plastic film to obtain a metallic balloon having an insulating property. It is preferable that the metal vapor deposition layer is formed in a state of islands in the sea, in which the size of each of the islands (metal deposition dots) is within the range of 200 Å to 1 μm and the interval between the islands is within the range of 100 Å to 5000 Å.

If the size of the islands is below 200 Å, a beautiful metallic gloss can not be given to the balloon. On the other hand, if the size of the islands is above 1 μm, the islands which are electroconductive dots are positioned so closely to get into contact to one another and to reduce the insulating property of the balloon.

If the interval between the islands is below 100 Å, an electric current is caused by a tunnel effect to reduce the insulating property of the balloon. On the other hand, if the interval between the islands is above 5000 Å, the amount of the metal in the balloon is too small to obtain a beautiful metallic gloss. Further, if the interval between the islands exceeds 5000 Å, the density of the metal vapor deposition layer on the plastic film is excessively low, resulting in lowering the abrasion resistance of the metal vapor deposition layer.

For obtaining the desired metal vapor deposition layer as described above, the vaporization speed and the thickness of the metal vapor deposition layer should be controlled. The difficulty accompanied with the control is affected largely by the type of employed metals. Generally, with the use of metals having a low melting point and noble metals, the control can be attained relatively with ease. Especially, Sn, Pb, Zn, Bi and the like are preferably used in the invention. To the contrary, with the use of transition metals such as Ti, Cr, Fe, Co, Ni and the like, and semiconductive metals such as Si, Ge and the like, the control is relatively difficult.

Further, it depends on control of the relationship between the cohesion energy and the adsorption energy of a metal employed whether the metal vapor deposition layer in a state of islands in the sea, available in the invention, can be obtained or not. Accordingly, various conditions for forming the metal vapor deposition layer should be controlled. In general, the size of islands has a tendency to decrease as the metal vaporization speed is increased. However, the state of the metal vapor deposition layer is predominently affected by the thickness of the metal vapor deposition layer.

In the case of employing Sn, the dielectric breakdown voltage is lower than 1000 V in the range where the light transmittance of the metal vapor deposition layer is below 3 to 10%. On the other hand, in the range where the light transmittance exceeds 15%, the dielectric breakdown voltage is higher than 12,000 V. However, in this light transmittance range, a beautiful metallic gloss is not given to the balloon. Generally, the gloss of the metal vapor deposition layer needs to be not less than about 350% from the viewpoint of a beautiful metallic gloss to be given to the balloon. In the range where the light transmittance of the metal vapor deposition layer is less than 15%, the gloss of the metal vapor deposition layer is 350% or more. However, in the range where the light transmittance of the metal vapour deposition layer is below 3 to 10%, although the gloss of the layer is 450% or more, the dielectric breakdown voltage is less than 1000 V.

The heat-sealable sheet used in the invention may be produced by forming a metal vapor deposition layer on one side of a heat-sealable plastic film and, if necessary, further forming a protective layer on the metal vapor deposition layer, or by forming a metal vapor deposition layer on one side of a general plastic film and then forming a heat-sealable layer on the outer surface of either the plasitic film or the metal vapor deposition layer.

As the plastic films used in the invention, there are included polyamides, polyesters, polyolefines and the like. Heat-sealable plastic films such as undrawn polypropylene films and polyethylene films may be used without an additional heat-sealable layer.

An additional heat-sealable layer or a protective layer may be provided by bonding polyethylene film, a polyvinylchloride film or the like, extrusion-laminating a polyethylene, or coating a heat-sealable resin such as polyethylene and the like.

The metal vapor deposition layer may be formed by a well-known thin metal film forming method such as vacuum vapor deposition, sputtering, ion plating and the like. It may be formed on a plastic film directly or after treating the plastic film.

Generally, the metal vapor deposition layer in a state of islands in the sea is formed by the steps of "forming a nuclei", "joining the nuclei" and then "forming an initial structure of islands".

Colouring or printing may be desirably conducted on the metal vapor deposition layer.

The balloon of the invention is formed by heat-sealing a heat-sealable sheet comprising the above-mentioned metal vapor deposition layer. No particular restrictions are imposed on the shape and size of the balloon. For example, in case of the balloon formed of one sheet, typically, the heat-sealable sheet is folded in such a manner that the heat-sealable surface (heat-sealable film or heat-sealable layer) is positioned on the inside of the folded sheet, and heat-sealed, i.e., in a circular line. In case of the balloon formed with two sheets, one of the heat-sealable sheet is overlayed on the other sheet in such a manner that the heat-sealable surfaces are in opposition to each other, and heat-sealed, i.e., in a circular line. In these cases, the balloons, when inflated with air or a gas, have a circular plane and an elliptical side. Further, as a typical example, many pieces of the sheet such as many sector-shaped pieces may be heat-sealed and connected to one another so as to form the balloon which becomes a sphere when inflated with air and a gas.

Needless to say, the balloon may be provided with an air or gas inlet and/or with a string in place. No particular restrictions are imposed on the structure of the air or gas inlet and the means for providing the inlet. The air or gas inlet may be provided with the balloon before or after the balloon is formed by heat-sealing the metallic and insulating heat-sealable sheet.

The balloon is inflated with air or a gas through the inlet for application. For applications where the balloon is needed to rise up in the air, the balloon may be inflated with a gas having a lower specific gravity than air.

DETAILED DESCRIPTION OF THE PREFERRED EMBODIMENTS

The invention will be illustrated by way of the following examples which are for the purpose of illustration only and are in no way to be considered as limiting.

EXAMPLES 1 AND 2

On one side of a polyethylene terephthalate film with thickness of 12 μm, a Sn vapor deposition layer in a state of islands in the sea as described in Table 1 was formed by a vacuum vapor deposition method with use of a semi-continuous vacuum vapor deposition machine. The employed vapor deposition conditions are as described in Table 1.

TABLE 1

|  | Vaporization Speed (g/min) | Light Transmittance (%) | Size of Island (μm) | Interval between Islands (Å) |
|---|---|---|---|---|
| Example 1 | 0.5 | 15 | 0.4 | 500 |
| Example 2 | 1.0 | 10 | 1.0 | 500 |

*(1) The light transmittance was controlled by adjustment of the film take-up speed.
*(2) The light transmittance is a total light transmittance measured according to JIS K 6714.
*(3) The size of island (Sn vapor deposition dot) is a mean value obtained by observation of the Sn vapor deposition layer with an electromicroscope.
*(4) The interval between the islands (Sn vapor deposition dots) is a mean value obtained by observation of the Sn vapor deposition layer with an electromicroscope.

CONTROL 1

Example 1 was repeated except that a continuous Al vapor deposition layer of 500 Å was formed instead of the discontinuous Sn vapor deposition layer to obtain a metal vapor deposition film.

The dielectric breakdown voltage of the metal vapor deposition films of Examples 1 and 2 and Control 1 was measured. A column-shape electrode with diameter of 50 mm and a guard ring electrode with diameter of 70 mm and thickness of 5 mm were positioned concentrically to each other, in contact to the surface of the metal vapour deposition layer of a sample film. Then, voltage was applied between the electrodes. A voltage applied when the metal vapor deposition layer was perforated by the produced electric discharge accompanied with the exposure of the polyethyleneterephthalate film was measured. The measurements of the dielectric breakdowm voltage of Examples 1 and 2 and Control 1 are shown together with the surface gloss of the films in Table 2.

TABLE 2

|  | dielectric breakdown voltage | gloss |
|---|---|---|
| Example 1 | ≧120000 V | 350% |
| Example 2 | 1000 V | 450% |
| Control 1 | 300 V | 800% |

A heat-sealable layer was laminated on the metal vapor deposition layer of each product obtained in Examples 1 and 2 and Control 1 by extrusion-laminating a polyethylene to prepare three metallic heat-sealable sheets. By heat-sealing each of the metallic heat-sealable sheets, balloons were prepared.

The balloons according to Examples 1 and 2 were substantially insulated to be used stably in various fields without any troubles by contacting with an electric wire.

EXAMPLES 3 AND 4

On one side of an undrawn polypropylene film with thickness of 30 μm, a Sn vapor deposition layer in a state of islands in the sea as described in Table 3 was formed by a vacuum vapor deposition method with use of a semi-continuous vacuum vapor deposition machine. The employed vapor deposition conditions are as described in Table 3.

TABLE 3

|  | Vaporization Speed (g/min) | Light Transmittance (%) | Size of Island (μm) | Interval between Islands (Å) |
|---|---|---|---|---|
| Example 3 | 0.5 | 15 | 0.4 | 500 |
| Example 4 | 1.0 | 10 | 1.0 | 500 |

CONTROL 2

Example 3 was repeated except that a continuous Al vapor deposition layer of 500 Å was formed instead of the Sn discontinuous vapor deposition layer to obtain a metal deposition film.

The dielectric breakdowm voltage of the metal vapor deposition films of Examples 1 and 2 and Control 1 was measured in the same manner as in Example 2. The measurements of the dielectric breakdown voltage of Examples 3 and 4 and Control 2 are shown together with the surface gloss of the films in Table 4.

TABLE 4

|  | dielectric breakdown voltage | gloss |
|---|---|---|
| Example 3 | ≧12000 V | 350% |
| Example 4 | 1000 V | 450% |
| Control 2 | 300 V | 800% |

By heat-sealing each of the metal vapor deposition films obtained in Examples 3 and 4 and Control 2, balloons were prepared. Each of the balloons according to Example 3 and 4 are substantially insulated to be used stably in various fields without any troubles by contacting with an electric wire.

As described above, the metal deposition layer contained in the balloon according to the invention is discontinuously formed to have a metallic appearance but to have a substantially insulating property, which enables the balloon to have dielectric breakdown voltage of not less than 1000 V with ease. In application, there are eliminated possibilities of the balloon to cause a firing or hazard persons when the balloon gets into contact with electric wires and the like, or cause an error operation of a computer. The balloon according to the invention has a beautiful metallic gloss, and is useful for decorative purposes as well as conventional balloons formed of metal vapor depositin films.

What is claimed:

1. A balloon formed by heat-sealing at least one heat-sealable sheet which comprises a plastic film and a metal vapor deposition layer formed on one side of the plastic film, characterized in that the metal vapor deposition layer is composed of Sn and discontinuously formed so that the sheet has a metallic appearance but has a dielectric breakdown voltage of at least 1000 V.

2. A balloon as defined in claim 1, wherein the metal vapor deposition layer is formed in the state of islands in the sea, the size of the island being 200 Å to 5000 Å.

3. A balloon as defined in claim 1, wherein the plastic film is heat-sealable.

4. A balloon as defined in claim 3, wherein the heat-sealable plastic film is selected from the group consisting of undrawn polypropylene films and polyethylene film.

5. A balloon as defined in claim 1, wherein the heat-sealable sheet has an additional heat-sealable layer formed on either the plastic film or the metal vapor deposition layer, the balloon being formed by heat-sealing the heat-sealable layer.

6. A balloon as defined in claim 5, wherein the plastic film is selected from the group consisting of polyamide films, polyester films and polyolefin films.

7. A balloon as defined in claim 5, wherein the heat-sealable layer is a polyethylene.

8. A balloon as defined in claim 1, wherein the metal vapor deposition layer has a light transmittance of 10% to 15%.

* * * * *

UNITED STATES PATENT AND TRADEMARK OFFICE
CERTIFICATE OF CORRECTION

PATENT NO. : 4,928,908
DATED : May 29, 1990
INVENTOR(S) : Shigeo Horii

It is certified that error appears in the above-identified patent and that said Letters Patent is hereby corrected as shown below:

In Col. 1, line 16, "vapour" should read -- vapor --; on line 22, "vapour" should read -- vapor --.

In Col. 4, line 32, "dowm" should read -- down --; on line 37, in Table 2, Example 1, "$\leq 120000$ V" should read -- $\geq 12000V$ -- . -- $\leq 12000$ V --.

In Col. 5, line 7, "breakdowm" should read -- breakdown --; on line 23, "are" should read -- was --.

In Col. 6, line 3, "depositin" should read -- deposition --.

Signed and Sealed this

Twenty-first Day of July, 1992

Attest:

DOUGLAS B. COMER

*Attesting Officer*     Acting Commissioner of Patents and Trademarks